Figure 1:
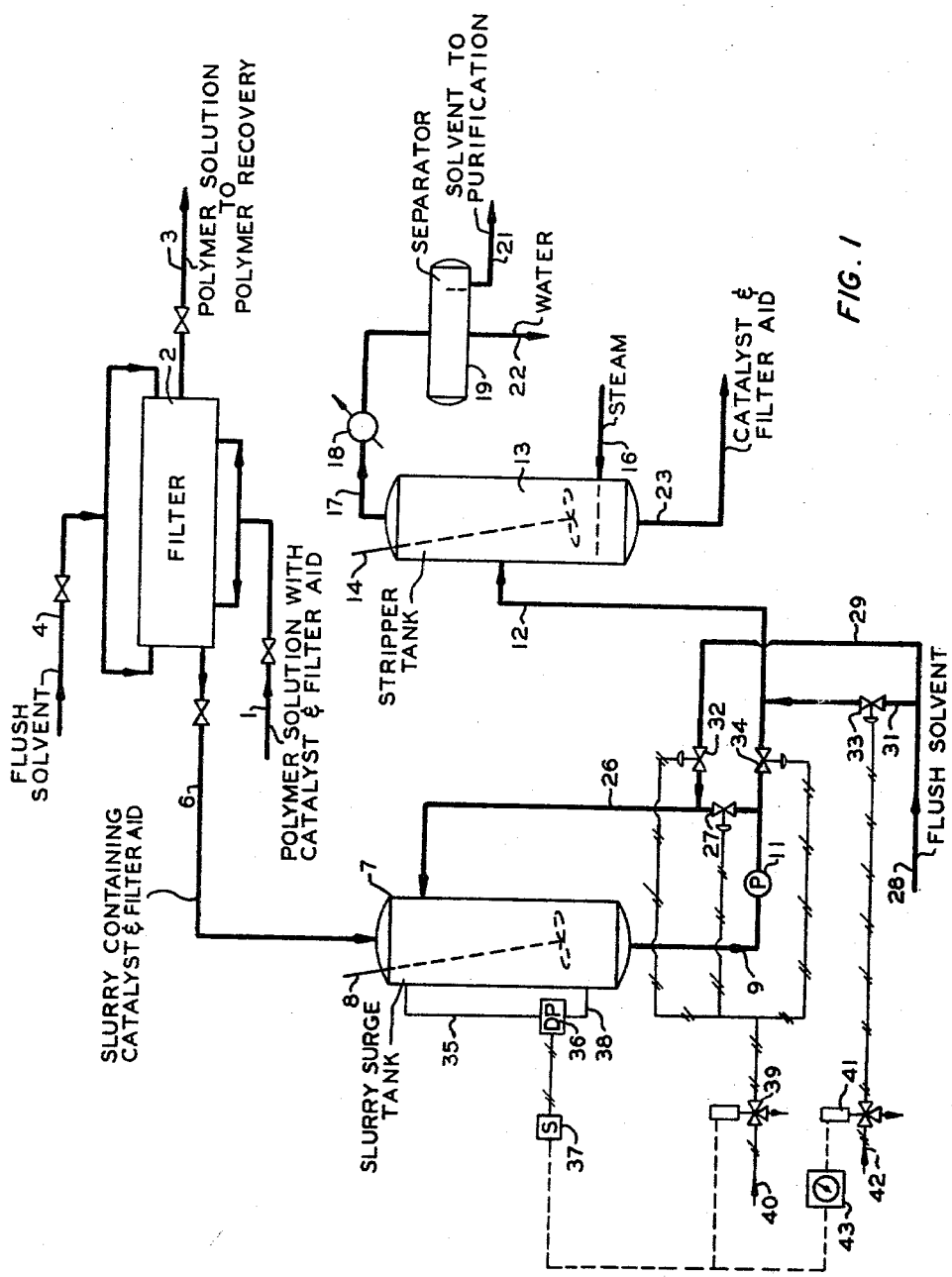

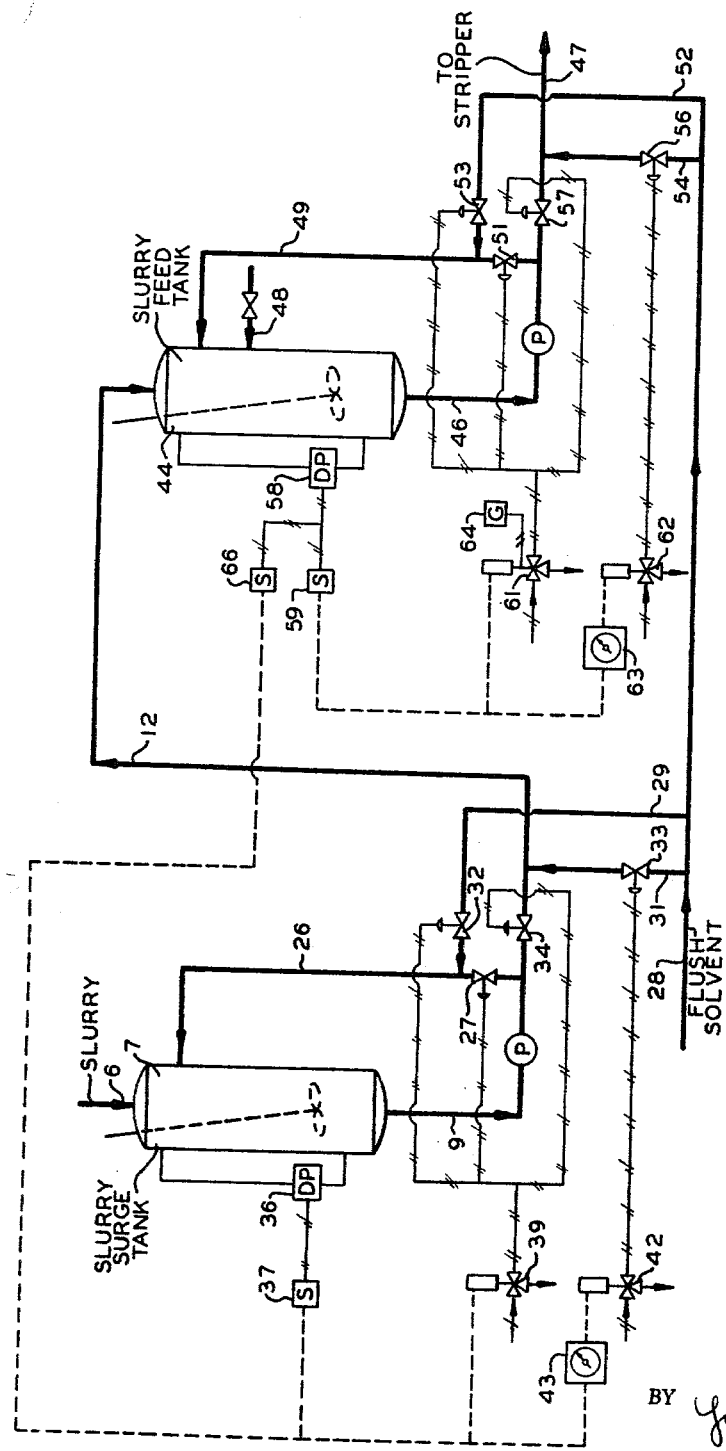

United States Patent Office 3,181,544
Patented May 4, 1965

3,181,544
SYSTEM FOR DISCHARGING SLURRY
FROM A TANK
Thomas A. Reid, Pasadena, Tex., assignor to Phillips
Petroleum Company, a corporation of Delaware
Filed Aug. 17, 1962, Ser. No. 217,613
9 Claims. (Cl. 137—15)

This invention relates to a system for discharging slurry from a tank. In another aspect, it relates to a method and apparatus for discharging a slurry, such as a slurry comprising an organic solvent and finely divided solids with thermoplastic material in solution or deposited on the solids, from a tank or the like containing said slurry and having a variable slurry content.

In many processes in the chemical and allied industries it is often necessary to discharge a slurry from a tank or the like, the volume of slurry in the tank being variable, for example because the tank is batch-fed with the slurry or fed at a variable rate. Usually a pump is used to effect this discharge and the contents of the tank are agitated by a stirrer. Frequently the level of the slurry in the tank falls until the tank becomes empty. If the operation of the discharge pump and agitator are continued after the tank is emptied, it is not uncommon to find that the pump and agitator seals have become badly worn and in need of replacement. Further, that the solids in the slurry downstream of the pump often settle out and plug downstream lines and equipment, necessitating shutdown for the cleaning of obstructions or reduced slurry flow rates when the tank is again filled and discharged through plugged downstream lines. The added cost of replacing seals, shutdown time, and drop in production rate has given rise to the need for an improved system for discharging slurries from such tanks.

Accordingly, an object of this invention is to provide an improved system for discharging slurry from a tank or the like. Another object is to provide an improved method and apparatus for discharging a slurry, such as a slurry comprising organic solvent and finely divided solids with solid or semi-solid thermoplastic material in solution or deposited on the solids, from a tank or the like containing said slurry and having a variable slurry content. Another object is to provide an improved method and apparatus for discharging slurry from a tank in such a manner as to reduce costs by minimizing seal replacements on the tank discharge pump and agitator, prevent plugging of downstream lines and equipment due to deposited solids, etc. Further objects and advantages of this invention will become apparent to those skilled in the art from the following discussion, appended claims, and accompanying drawing in which:

FIGURE 1 is a flowsheet schematically illustrating the application of this invention; and FIGURE 2 is a flowsheet illustrating a modification of that shown in FIGURE 1.

Briefly, in one aspect of this invention, I have discovered that a tank containing a variable volume of slurry can be discharged in an improved manner by automatically recycling the discharged slurry to the tank and flushing the discharged slurry downstream of the point of recycle when the volume of slurry in said tank drops to a first predetermined volume, and automatically passing the discharged slurry downstream of said point of recycle while flushing the recycle line when the volume of slurry in the tank rises to a second predetermined volume. By operating in this manner, the discharge pump and tank agitator can be continuously run without damage to their seals and the plugging of downstream discharge lines and equipment reduced.

In another aspect of this invention, I have discovered where said tank containing a variable volume of slurry discharges its slurry to a downstream tank which similarly contains a variable volume of slurry, and where the volume of slurry in this downstream tank drops to a first predetermined level causes a similar recycle and flushing of discharged slurry until the level in the downstream tank rises above a second predetermined level, when the level in the downstream tank rises to an even higher or third predetermined level close to the maximum capacity of the downstream tank, the recycle of slurry of the upstream tank is begun and continued notwithstanding the rise of level of slurry therein to its said second predetermined level. By operating in this manner, not only can the discharge pump and agitator associated with the downstream tank be similarly continuously run, but overfilling of the downstream tank can be avoided.

The discharge control system of this invention and its application to a typical process are illustrated in FIGURE 1 of the accompanying drawing. This drawing will now be described. But the application of this invention to the process illustrated in the drawing and described hereinbelow should not be construed to limit unduly this invention, since it will find utility in any process where there is a need to discharge a slurry from a tank or the like having a variable slurry volume.

In FIGURE 1, a slurry comprising a polymerization effluent from which unreacted monomer has been removed and to which additional solvent can be added is passed through line 1 to a filter 2 which can be pre-coated with a suitable filter aid such as diatomaceous earth. Additional filter aid can also be added to the filter feed. Catalyst particles are deposited on the filter cake of the filter members and the polymer solution substantially free of catalyst passes through line 3 to subsequent polymer recovery operations. Filter 2 is operated batch-wise and the filter cake is removed from the filter by closing the valves in lines 1 and 3 and introducing a flush or sluice solvent through line 4 and removing the slurry formed, comprising solvent, catalyst and filter aid, through line 6. Polymer can also be present in this slurry since some of this polymer may be deposited on the catalyst during the polymerization process. Also, although the filter cake is washed, some slurry solution will remain in the cake and will be carried out with the flush solvent.

The slurry containing catalyst and filter aid is passed batch-wise to a surge tank 7 which can be provided with suitable agitation means 8 to maintain the solids in slurry form. The slurry in tank 7 is withdrawn via line 9 and pumped by means of pump 11 and line 12 to a stripper tank 13. (Alternatively, the slurry can be pumped to a stripper feed tank—not shown in FIGURE 1—in line 12, and then passed to stripper tank 13.) Water can be added to line 12 to aid in transferring the slurry to tank 13. Tank 13 can also be provided with suitable agitation means 14. Steam can be supplied via line 16 to the bottom of tank 13, and additional steam can be introduced into line 12 to mix with the slurry. Steam distillation takes place in tank 13 and vapors of water and solvent separate in separator 19, and solvent is removed through line 21 and passed to further purification steps. Water from separator 19 is removed through line 22 and it can be recycled for reuse, drained, etc. The residue of the stripping operation, which comprises water, catalyst, polymer and filter aid, is removed from stripper tank 13 via line 23 and sent to suitable disposal, catalyst recovery and/or polymer recovery.

Thus far, what has been described in the drawing is conventional and by itself does not constitute the invention of this application. It should be evident that when the slurry from tank 7 is continuously discharged by lines 9 and 12 to the stripper tank 13, tank 7 will eventually be emptied. The continued operation of stirrer 8 and pump 11 after the tank is empty will severely wear the seals used in these items and need to be replaced very shortly. Further, the slurry in line 12 will tend to deposit and plug downstream lines, requiring shutdown for purposes of removing obstructions, or in the event that tank 7 again becomes sufficiently filled, the flow rate through line 12 may be reduced due to the obstructions deposited in this line. The manner in which these problems are overcome by this invention will now be discussed.

First of all, there is provided by this invention a recycle line 26, the upstream end of which is connected to line 9 at a point downstream of pump 11 and the downstream end of which is connected to the upper end of tank 7. This recycle line 26 is provided with flow control means 27 such as a normally closed motor flow rate control valve. Flush solvent, which can be the same as the liquid phase of the slurry, is supplied by line 28, some of it passing via line 29 to recycle line 26 downstream of valve 27 and some of which is passed via line 31 to line 12. Flush solvent line 29 is also provided with flow control means 32, such as normally open motor operated flow control valve, and flush solvent line 31 provided with a normally closed motor flow control valve 33. Flow control means 34 such as a normally open motor flow control valve, are provided in line 12 downstream of the point of recycle and upstream of the point at which flush solvent from line 31 is introduced into line 12.

According to this invention, the slurry discharged via line 9 from tank 7 is recycled via line 26 and flush solvent passed (continuously or for a predetermined period of time) via line 31 into line 12 to flush whatever slurry may be present in line 12. This recycling and flushing takes piece when the level of slurry in tank 7 falls to a predetermined value, e.g., when the volume of slurry in tank 7 is 15 percent of the volume of tank 7. To effect this operation, flow control means 27 and 33 are open and flow control means 32 and 34 are closed. When tank 7 rises to a predetermined value, e.g., when the volume of slurry in tank 7 is 30 percent of the tank's volume, the recycle of slurry via line 26 is discontinued and the slurry is pumped via line 12 to tank 13, and flush solvent is passed via line 29 to recycle line 26 to flush whatever slurry is left in recycle line 26 back into tank 7. To effect this operation, flow control valves 32 and 34 are opened and flow control valve 27 and 33 are closed.

FIGURE 1 illustrates one embodiment of a control system which can be used to automatically operate said flow control means. In the drawing, a differential pressure measuring device and transmitter 36 (such as a d/p cell, described in Bulletin 450 of the Foxboro Co.) is provided adjacent tank 7, one side of the cell communicating via line 35 to the top of the tank and the other side communicating via line 38 to a predetermined elevation in tank 7, e.g., a point at which slurry in tank 7 occupies less than 15 percent of the tank's volume. This differential pressure device continuously converts the differential pressure due to the head of slurry in tank 7, into a proportional air pressure, which is transmitted to a switch 37 (such as mercury contact switch described in Catalog 600A of the Mercoid Corp.). This switch is set to trip when the slurry in tank 7 drops to a predetermined volume and remains closed until the slurry in the tank rises to a predetermined volume. Switch 37 is electrically connected to a solenoid operated air valve 39, which regulates the flow of instrument air 40 to flow control valves 32, 27 and 34. Alternatively, instead of using just one such solenoid valve 39, three such valves can be used to control separate air supplies to each of valves 32, 27 and 34. Switch 37 can also be electrically connected to another solenoid operated valve 41 controlling the supply 42 of air to flow control valve 33, but preferably transmits a signal to a timer 43 so that solenoid valve 41 (and thus flow control valve 33) are energized for a predetermined time only, e.g., the first 10 minutes of recycle time. In the operation of this control system, when the volume of slurry in tank 7 falls to a predetermined value, differential pressure transmitter 36 trips switch 37 which energizes solenoid valve 39 and starts timer 43 (which energizes solenoid valve 41). As a result, valve 27 is opened and valve 34 is closed to permit the discharged slurry to be recycled via line 26, and valve 33 is opened, e.g., for 10 minutes, to permit flush solvent from line 31 to flush whatever slurry remains in line 12 to tank 13. At a later time, when the slurry in tank 7 rises to a predetermined volume, differential pressure transmitter 36 causes switch 37 to reset, at which time the solenoid valve 39 is deenergized to stop the flow of air to valves 32, 34. When this happens, valve 27 is closed (and valve 33 is also closed, unless it was closed earlier, for example after the first 10 minutes of recycle) and valves 32 and 34 are opened, permitting flush solvent from line 29 to flush to tank 7 whatever slurry remains in line 26 and to permit the normal passage of discharged slurry from tank 7 to tank 13 via line 12.

It is also within the scope of this invention to monitor the level of slurry in the tank by means of a conventional liquid level controller and operate said flow control valves 27, 32, 33 and 34 in response to such controller.

As a specific example of this invention, ethylene polymerization effluent, from which unreacted ethylene has been removed, comprising a solution of polyethylene in cyclohexane solvent and containing solid chromium oxide-silica catalyst, is passed via line 1 to filter 2, such as a Vallez filter having a precoat of diatomaceous earth on the filter surface, operated at a temperature of 305° F. The filtrate, comprising a solution of polyethylene, is withdrawn from filter 2 and passed via line 3 to polymer recovery operations. When the pressure drop across the filter reaches about 30 p.s.i.a., the flow of filter feed is stopped and the filter cake is washed with cyclohexane supplied via line 4 to remove polymer solution, which is also passed via line 3. The filter cake is then removed from filter 2 with cyclohexane and flows via line 6 as a slurry in cyclohexane. The slurry comprising filter aid, catalyst, cyclohexane and some dissolved polyethylene, is then passed via line 6 to tank 7, which serves as a surge tank, e.g. at 240° F. and 48 p.s.i.a. When the filter cake has been flushed from filter 2 as described, additional polymer solution can be filtered and the removal of filter cake operation repeated.

When the slurry in tank 7 occupies a volume greater than that of a predetermined value, e.g., 30 percent or greater of the volume of tank 7, it is discharged via line 9 and pumped by pump 11 and line 12 to stripper tank 13, where it is steam distilled at 180° F. and 3 inches Hg vacuum. Substantially all of the cyclohexane is evaporated in the steam distillation and condensed from the water vapors at 155° F. The solvent is recovered by phase separation from the water in separator 19. The residue from stripper tank 13 comprises catalyst, water and polyethylene deposited on the catalyst and precipitated as particles in the slurry. During this normal discharge of tank 7, flush solvent, such as cyclohexane, is passed via line 29 to recycle line 26, valves 32 and 34 being opened for this purpose and valves 27 and 33 being closed.

When the slurry of tank 7 falls to a predetermined value, 15 percent of the volume of tank 7, the slurry discharged via line 9 and pumped by pump 11 is recycled by line 26 into the top of tank 7. For the first ten minutes of recycle, flush solvent is passed via line 31 to line 12 to flush out the slurry in line 12 and pass it to tank 13. To effect this recycling and flushing operation, valve 27 is opened, valves 32 and 34 are closed, and valve 33 is opened for the first ten minutes of recycle, after which it closes. When the slurry in tank 7 again rises to a predetermined value, e.g., when the slurry volume in tank 7 occupies at least 30 percent of the tank's volume, the normal discharge of the slurry from tank 7 and its passage to tank 13 is repeated, etc.

Referring now to FIGURE 2, where a modification of that of FIGURE 1 is shown and where like reference numbers have been used to designate like parts, the slurry discharged from slurry surge tank 7 is normally pumped via line 12 to a stripper feed tank 44, from which slurry can be discharged and pumped via lines 46, 47 to a stripper, such as stripper 13 of FIGURE 1.

Stripper feed tank 44 can also have a variable volume of slurry therein, and in addition to being fed by line 12 can be fed with slurry from one or from other slurry surge tanks, or from other sources, for example via line 48. Stripper feed tank 44 is similarly provided with a recycle line 49 having a normally closed flow control valve 51 therein, a flush line 52 having a normally open flow control valve 53 therein and connected to recycle line 49 downstream of valve 51, a flush line 54 having a normally closed flow control valve 56 therein and connected to line 47 downstream of the point of recycle, and a normally open flow control valve 57 in line 47 downstream of the point of recycle and upstream of the point at which flush solvent from line 54 is introduced into line 47. The operation of the valves associated with stripper feed tank 44 is similar to that of slurry surge tank 7, and differential pressure device 58, switch 59, solenoid valves 61, 62 and timer 63 can be provided for this purpose, these elements operating like their counterparts in FIGURE 1. However, I prefer to provide solenoid valve 61 with a manual reset 64 so that after the level of slurry in stripper feed tank 44 rises above a predetermined level, e.g., the volume of slurry reaches 40 percent of the volume of the tank 44, the recycle of slurry via line 49 can be manually terminated by the operator by pushing manual reset 64 when he determines that the danger of pumping tank 44 empty is overcome.

In some cases, the volume of slurry in stripper feed tank 44 will come close to the maximum capacity thereof and the danger of overfilling this tank will be presented. According to this invention, this danger is overcome by terminating the flow of slurry via line 12 to the stripper feed tank. This can be accomplished by providing a second switch 66 (similar to switches 37, 59) which is set to trip when the slurry in stripper feed tank 44 rises to a predetermined value near the maximum capacity of tank 44 and the overfilling of tank 44 is imminent, e.g., when the volume of slurry reaches 80 percent of the maximum capacity of tank 44. When this level is reached, switch 66 causes solenoid valve 39 to energize, if it isn't in this state at the time, and starts timer 43 if at this time slurry was being discharged via line 12. When the level in stripper feed tank 44 drops, e.g., when the volume of slurry drops to 60 percent, switch 66 resets and the recycled flow of discharged slurry to tank 7 is terminated (unless, of course, switch 37 is in its tripped state due to the drop of slurry level in tank 7 to its low-predetermined level).

Although the slurry surge tank 7 may come close to being overfilled at the same time as stripper feed tank 44, this happenstance can be minimized or prevented by the right choice of the number and sizes of such tanks. This happenstance can also be prevented by the operator terminating the flow of slurry via line 6 or letting the filter 2 run without flushing, or he can divert the flow of flushed slurry from filter 2 to another surge tank. For example, the differential pressure device 36 can trip a switch when the volume of slurry in tank 7 nears its maximum capacity, and this switch can automatically manipulate the flow control valves in lines 4 and 6 to close the same. In the event that slurry is also passed into stripper feed tank 44 via line 48, and this tank reaches its danger overflow level, this flow in line 48 can also be cut off along with the abovedescribed cutoff of flow in line 12. For example, where additional such slurry surge tanks are provided and similarly operated, the signal from switch 66 can also be used to terminate the discharge of slurry from these tanks to stripper feed tank 44.

Various modifications and advantages of this invention will become apparent to those skilled in the art from the foregoing description and accompanying drawing and it should be apparent that this invention is not to be limited unduly to that set forth herein for illustrative purposes.

I claim:

1. A method of discharging a slurry from a tank having a variable volume of said slurry therein, which comprises continuously discharging said slurry from said tank, continuously measuring the volume of slurry in said tank, recycling discharged slurry to said tank while flushing discharged slurry downstream of the point of recycle when the volume of slurry in said tank falls to a predetermined value, and passing discharged slurry downstream of said point of recycle while flushing the recycle line when the volume of slurry in said tank rises to predetermined value.

2. The method according to claim 1, wherein the flushing of discharged slurry downstream of said point of recycle takes place for a predetermined length of time.

3. Apparatus for discharging a slurry, comprising a tank, discharge conduit means connected to said tank, recycle conduit means connected to said discharge conduit means and said tank, downstream conduit means connected to said discharge conduit means at a point downstream of the point where said recycle conduit means are connected to said discharge conduit means, first flow control means in said recycle conduit means, second flow control means in said downstream conduit means, first flush conduit means connected to said recycle conduit means downstream of said first flow control means, third flow control means in said first flush conduit means, second flush conduit means connected to said downstream conduit means downstream of said second flow control means, fourth flow control means in said second flush conduit means, and means to measure the volume of slurry in said tank and control said flow control means, such that said first and fourth control means are opened and said second and third flow control means are closed when the volume of slurry in said tank drops to a predetermined volume, and said opened and closed conditions of said flow control means are reversed when the volume of slurry in said tank rises to a predetermined value.

4. Apparatus according to claim 3, wherein said fourth flow control means are opened for a predetermined length of time when the volume of slurry in said tank drops to said predetermined value.

5. A method of discharging slurry from first and second tanks connected in series and having variable volumes of slurry therein with the slurry discharged from said first tank normally being passed into said second tank, which comprises continuously discharging slurry from each of said tanks; in the case of each of said tanks, continuously measuring the volume of slurry in the tank, recycling discharged slurry from the tank back to the tank while flushing discharged slurry downstream of the point of recycle when the volume of slurry in the tank falls to a predetermined value, and passing discharged slurry downstream of said point of recycle while flushing the recycle line when the volume of slurry in the tank rises to a predetermined value; and recycling discharged slurry from said first tank back to said first tank when the volume of slurry in said second tank reaches a predetermined value indicative of imminent overfilling of said second tank.

6. The method according to claim 5, further comprising also flushing discharged slurry downstream of the point of recycle of said first tank when the volume of slurry in said second tank reaches said predetermined value indicative of imminent overfilling, provided the discharged slurry from said first tank was being passed into said second tank when the latter volume is reached.

7. Apparatus for handling a slurry, comprising first and second tanks; each of said tanks having a discharge conduit means and recycle conduit means connected to said discharge conduit means, downstream conduit means connected to said discharge conduit means at a point downstream of the point where said recycle conduit means are connected to said discharge conduit means, first flow control means in said recycle conduit means, second flow control means in said downstream conduit means, first flush conduit means connected to said recycle conduit means downstream of said first flow control means, third flow control means in said first flush conduit means, second flush conduit means connected to said downstream conduit means downstream of said second flow control means, fourth flow control means in said second flush conduit means, and means to measure the volume of slurry in said tank and control said flow control means, such that said first and fourth flow control means are opened and said second and third flow control means are closed when the volume of slurry in said tank drops to a predetermined volume, and said opened and closed conditions of said flow control means are reversed when the volume of slurry in said tank rises to a predetermined value; said means to measure and control of said second tank adapted to open said first control means of said first tank and close said second flow control means of said first tank when the volume of slurry in said second tank reaches a predetermined value indicative of imminent overfilling thereof.

8. Apparatus according to claim 7, further comprising manual reset means connected to said means to measure and control of said second tank to permit resetting thereof when the volume of slurry in said second tank reaches said predetermined value.

9. Apparatus according to claim 8, wherein said means to measure and control of said second tank also is adapted to open said fourth control means of said first tank when the volume of slurry in said second tank reaches said predetermined value indicative of imminent overfilling, provided discharged slurry from said first tank was being passed into said second tank when the volume of slurry in the latter reached the later predetermined value.

References Cited by the Examiner
UNITED STATES PATENTS

| | | | |
|---|---|---|---|
| 2,049,233 | 7/36 | Thomas | 137—109 |
| 2,189,950 | 2/40 | Gump | 137—15 |
| 2,196,176 | 4/40 | Brigham | 137—15 |
| 2,633,860 | 4/53 | Derrington | 137—109 |

MARTIN P. SCHWADRON, *Acting Primary Examiner.*

ISADOR WEIL, *Examiner.*